United States Patent
Rajala et al.

(10) Patent No.: US 7,392,051 B2
(45) Date of Patent: Jun. 24, 2008

(54) HANDOVER METHOD

(75) Inventors: Jussi Rajala, Espoo (FI); Mika Forssell, Espoo (FI); Janne Parantainen, Helsinki (FI)

(73) Assignee: Nokia Corporation, Espoo (FI)

( * ) Notice: Subject to any disclaimer, the term of this patent is extended or adjusted under 35 U.S.C. 154(b) by 246 days.

(21) Appl. No.: 10/492,915

(22) PCT Filed: Oct. 16, 2002

(86) PCT No.: PCT/IB02/04264

§ 371 (c)(1),
(2), (4) Date: Apr. 16, 2004

(87) PCT Pub. No.: WO03/034753

PCT Pub. Date: Apr. 24, 2003

(65) Prior Publication Data

US 2004/0248575 A1    Dec. 9, 2004

(30) Foreign Application Priority Data

Oct. 17, 2001 (GB) ................................. 0124958.0
Nov. 21, 2001 (GB) ................................. 0127926.4

(51) Int. Cl.
*H04Q 7/20* (2006.01)
*H04Q 7/00* (2006.01)

(52) U.S. Cl. ........................................ 455/436; 370/328

(58) Field of Classification Search ................. 455/436, 455/450, 509; 370/913, 328, 345, 318, 329, 370/230
See application file for complete search history.

(56) References Cited

U.S. PATENT DOCUMENTS

| 6,647,262 | B1 * | 11/2003 | Demetrescu et al. | ......... 455/436 |
| 2002/0045458 | A1 * | 4/2002 | Parantainen et al. | ......... 455/466 |
| 2004/0081248 | A1 * | 4/2004 | Parolari | ....................... 375/259 |
| 2004/0100920 | A1 * | 5/2004 | Ball et al. | ..................... 370/318 |
| 2004/0121769 | A1 * | 6/2004 | Aoki et al. | ................ 455/435.1 |
| 2004/0252661 | A1 * | 12/2004 | Lintulampi et al. | .......... 370/329 |

FOREIGN PATENT DOCUMENTS

WO   WO 00/79808 A2   12/2000
WO   WO 01/74095 A2   10/2001

* cited by examiner

*Primary Examiner*—Naghmeh Mehrpour
(74) *Attorney, Agent, or Firm*—Squire Sanders & Dempsey LLP

(57) ABSTRACT

The invention provides a method of handing over user equipment from a source cell to a target cell in a cellular communications network. The cellular communications system comprises a plurality of control units. The method comprises the steps of receiving a message indicating if the operation of the radio link control protocol is to be continued or reset when changing cell, resetting the operation of the radio link control protocol if the message indicates that the current radio link control protocol is to be reset, or continuing the operation of said radio link control protocol if the message indicates that the radio link control protocol is to be continued.

15 Claims, 6 Drawing Sheets

HANDOVER METHOD

FIELD OF THE INVENTION

The present invention relates to a method of handover. In particular, but not exclusively, the present invention relates to a method of handing over user equipment, for example, a mobile station from one cell to another cell of a cellular communications network. The mobile station may send and/or receive packets of data.

BACKGROUND TO THE INVENTION

Wireless cellular telecommunication networks are known. In this regard, reference is made to FIG. 1 which schematically shows a cellular communications network 2. The area covered by the network 2 is divided into cells 4. Each cell is provided with a base station 6. The base station 6 is arranged to communicate with mobile stations or other user equipment 8 located in the cells.

Various standards have been proposed for communication within the network. For example, one known standard is the GSM standard (global system for mobile communications). This is primarily designed for speech. The GPRS standard (general packet radio service) has been proposed for data. The GPRS standard has generally been proposed in the context of the GSM standard. The GSM standard allows circuit switched communication whilst the GPRS standard allows packet switched communication.

When a mobile station or user equipment moves, it can move from one cell into another. When that occurs, the user equipment or mobile station will generally stop communicating with the base station of its old cell and start communicating with the base station of the new cell. This is referred to as handoff or handover.

In the context of the GPRS standard, cell reselection procedures are specified. Cell reselection is where the mobile station or user equipment changes the cell (and the base station) with which it is associated. Currently, the standard specifies three cell reselection procedures. With the first two procedures NC0 and NC1, the mobile station makes the decision as to which cell the mobile station is to be associated. In the procedure NC2, the network makes the decision as to the cell with which the mobile station is to be associated. As will be appreciated, if the cells are overlapping or if the mobile station is located in border regions, different decisions can be made in different circumstances as to the cell with which the mobile station is to be associated.

The cell reselection procedures specified in the current GPRS standard are based on the assumption that the L2 link (—this is the TBF—temporary block flow link which is set up to carry the data blocks) is set up in the new cell after the cell has changed and after the mobile station has acquired the necessary system information to operate in the new cell. In other words, the mobile station changes the cell (and hence base station) with which it is associated and only then is the mobile station able to acquire the necessary information to allow it to operate. This has the disadvantage that this procedure is relatively slow. It can take some time for the mobile station to obtain the necessary system information messages and after that set up the TBF link. This causes a gap in transmission during a cell change which can last several seconds. This can cause a noticeable degradation in the quality of service. GPRS is often used for non-real time services. However, even in the context of the non-real time services, the gap of several seconds can still make an adverse impact on the quality.

In one modification to the standard, the concept of a network assisted cell change procedure was introduced. In this proposal, there was the aim of shortening the gap in transmission by sending the target cell (ie the new cell) system information via the old cell before terminating the link with that old cell and leaving the cell. The target cell information refers to System Information (SI) and Packet System Information (PSI) messages that the mobile must acquire before accessing the cell. These messages are usually broadcast on broadcast channels. Because the broadcast channel capacity is not very high these messages are broadcasted relatively seldom which causes long delay if the mobile station acquires this information by listening to the broadcast channel. The modification provides a mechanism where these messages can be sent during the ongoing TBF (Temporary Block Flow) via the source cell. In other words the mobile station does not have to listen to broadcast messages but gets this information during the ongoing TBF in the source cell. With this mechanism, the mobile station can set up the TBF link in the target cell without having any delay caused by the mobile station listening to information broadcast by the base station of the new cell in order to get the required system information messages. However, this proposed method still has the problem that there is a gap in transmission during a cell change as it takes some time to set up the TBF and resolve the contention resolution. This gap may still be long enough to provide a noticeable quality degradation in the provided levels of services.

It has been appreciated by the inventors that when a mobile station changes cell, the target cell and the current cell may be controlled by the same packet control unit. Currently, it is proposed to always reset the radio link control protocol entity or TBF. This is disadvantageous.

SUMMARY OF THE INVENTION

It is an aim of embodiments of the present invention to address or at least mitigate the problems described previously.

According to a first aspect of the present invention there is provided a method of handing over user equipment from a source cell to a target cell in a cellular communications network, said cellular communications system comprising a plurality of control units, said method comprising the steps of receiving a message indicating if the operation of the radio link control protocol is to be continued or reset when changing cell, resetting the operation of said radio link control protocol if the message indicates that the current radio link control protocol is to be reset, or continuing the operation of said radio link control protocol if the message indicates that the radio link control protocol is to be continued.

According to a second aspect of the present invention there is provided a method of handing over user equipment from a source cell to a target cell in a cellular communications network, said cellular communications system comprising a plurality of control units, said method comprising the steps of determining if the source cell and target cell in a communications system are controlled by the same control unit, and if it is determined that said source cell and target cell are controlled by the same control unit, then the operation of the current radio link control protocol of the source cell is maintained in the target cell.

According to a third aspect of the present invention there is provided a cellular communications network comprising at least one user equipment, a plurality of cells and a plurality of control units, said network being arranged to determine if a source cell and a target cell are controlled by the same control unit, the source cell being the current cell of the user equipment and the target cell being the cell to which the user equipment is to be handed over to, and the network is arranged if it is determined that said source cell and target cell are controlled by the same control unit, that a operation of a current radio link control protocol of the source cell be maintained in the target cell.

According to a further aspect of the present invention there is provided a cellular communications system comprising at least one user equipment, a plurality of cells and a plurality of control units, said user equipment being arranged to be handed over from a source cell to a target cell and being arranged to receive a message indicating if the operation of a current radio link control protocol of the source cell is to be maintained or reset in the target cell, the network being arranged to reset the operation of the radio link control protocol if the message indicates that the operation of the current radio link control protocol is to be reset, or to maintain the operation said radio link control protocol if the message indicates that the operation of the radio link control protocol is to be reset.

According to another aspect of the present invention there is provided a method of communication in a cellular communications network comprising at least one user equipment, a plurality of control units and a plurality of cells, said method comprising the step of sending information to the at least one user equipment identifying the control unit controlling said at least one user equipment.

BRIEF DESCRIPTION OF DRAWINGS

For a better understanding of the present invention and as to how the same may be carried into effect, reference will now be made by way of example only to the accompanying drawings in which.

DETAILED DESCRIPTION OF EMBODIMENTS OF THE INVENTION

Figure 2:
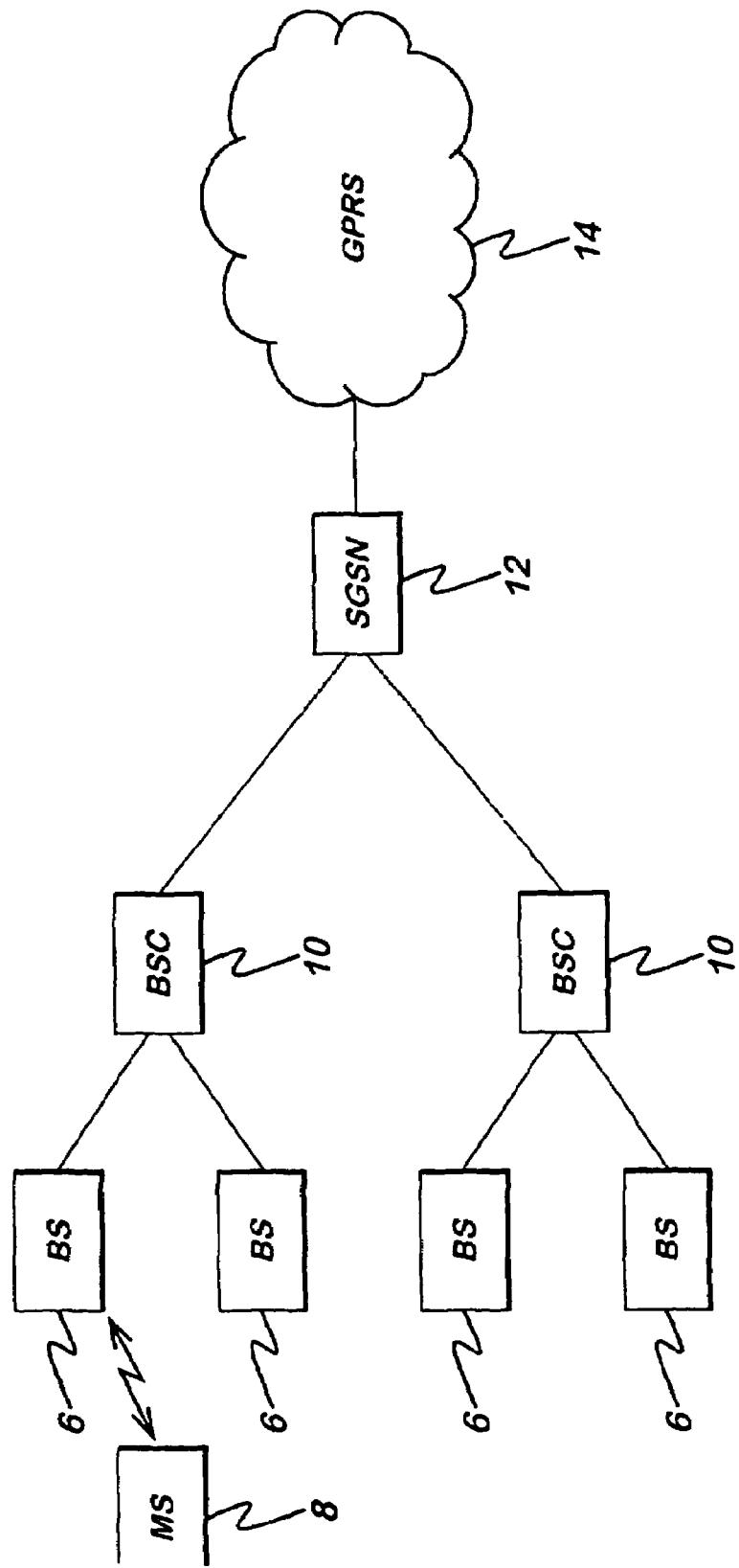
FIG. 2 shows a network in which embodiments of the present invention can be used.

Reference will be made to FIG. 2 which shows schematically the structure of a system in which embodiments of the present invention can be used. The mobile station 8 is arranged to communicate with respective base stations 6. In the schematic representation shown in FIG. 2, four base stations are shown. However, it should be appreciated that this is for illustrative purposes only and in practice a larger number of base stations will be provided. Each base station 6 is associated with a cell. The cells may be adjacent, partially overlapping or completely overlapping. The base stations 6 are controlled by respective base station controllers 10. Each base station controller 10 will usually control a number of base stations. In the example shown in FIG. 2, each base station controller is shown as controlling two base stations. In practice, each base station controller 10 will usually control more than two base stations. Each base station controller 10 is arranged to communicate with a signalling GPRS signalling node (SGSN) 12. A network generally has a number of these nodes. A GPRS transmission network 14 is provided which allows communication with other SGSN elements 12.

Packet control units may be provided in the network. The packet control unit can be provided in the base stations, the base station controller or the SGSN. In preferred embodiments of the present invention, the packet control unit is provided in the base station or the base station controller.

Embodiments of the present invention will be described in the context of a GPRS system. However, it should be appreciated that embodiments of the present invention can be applied to any other suitable system. Embodiments of the present invention are particularly applicable where the mobile station sends and/or receives packets of data. Thus, the air interface is packet switched. Where the air interface is packet switched, the remainder of the network can be circuit switched or packet switched. The GPRS system, in common with some other providers of packet services, is designed primarily for providing non-real time services. However, the GPRS system can be used with real time services in addition. For example, an internet call is an example of the real time service. An internet call is a telephone connection which is routed via the internet instead of via the more usual telephone networks. The internet call may be accompanied by a video portion. Other real time applications may be used with the GPRS system. As will be appreciated, embodiments of the present invention are particularly advantageous in non real time applications. However, even in real time applications, embodiments of the present invention may provide advantages.

Figure 1:
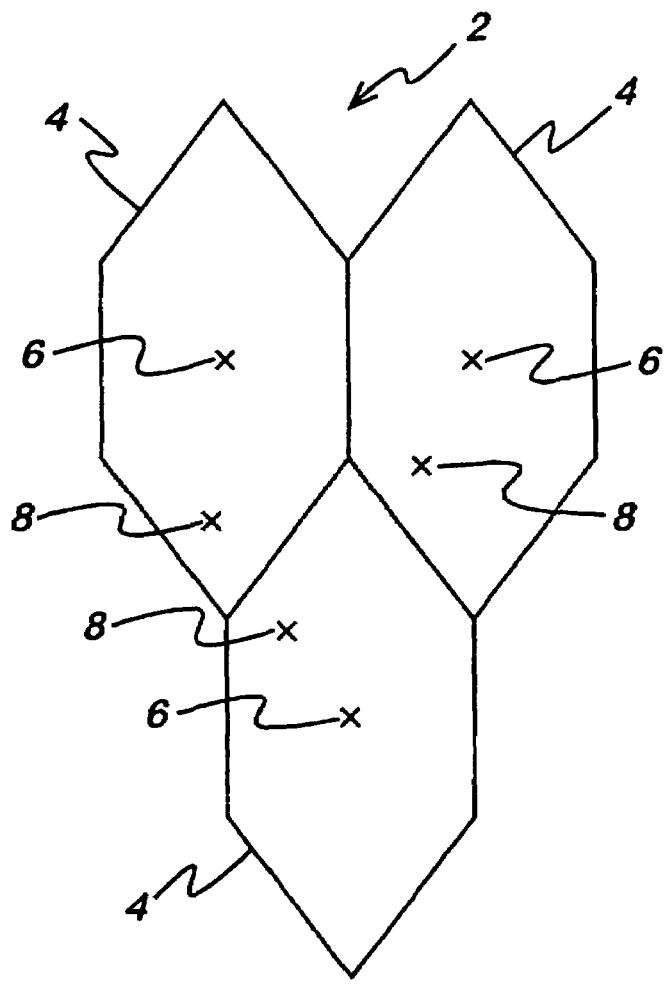
FIG. 1 shows schematically a cellular communications network.
Figure 3:
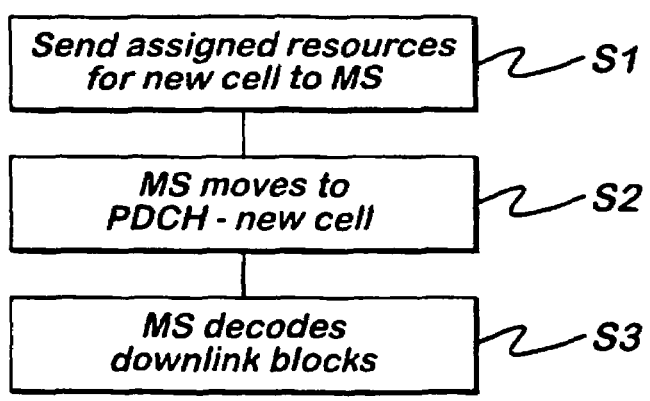
FIG. 3 illustrates the broad concepts of embodiments of the invention.

Reference will now be made to FIG. 3 which shows a flow chart of a method used in the context of the NC2 cell reselection mode. In other words, embodiments of the present invention can be used where cell reselection is controlled by the network. It should be appreciated that in alternative embodiments of the present invention, a new cell reselection mode can be specified. In alternative embodiments of the invention, the described method can be used in any other suitable mode. In step S1, the assignment of resources to the mobile station, when it is in its new cell, is sent to the mobile station whilst it is in its current or old cell. In other words, the mobile station is sent information defining the resources which it will use when it moves from its current cell to the target cell. In preferred embodiments of the present invention, the information is contained in the RLC/MAC (radio link control/medium access control protocol) assignment messages. These messages include the uplink and downlink packet assignment. This information can be included in any suitable message. For example, in preferred embodiments of the present invention, the information is included in the packet cell change order (PCCO) message as optional information. If this optional information is not included in that message, then the mobile station behaves in the way set out in the current version of the standard.

If, however, the message contains the additional information, the mobile station behaves as follows: It is assumed in the following that the system information is sent in the old cell using the packet neighbour cell data message. However, any other suitable message may be used in embodiments of the present invention.

In step S2, the mobile station moves to the PDCH (packet data channel) included in the PCCO message.

In step S3, the mobile station moves to the target cell. The mobile station receives a PCCO message which includes a block number when the mobile station moves to a target cell. In this block, the mobile station sends access bursts. The network estimates timing advance and informs the mobile station of this in a downlink control block. Thereafter normal operation continues.

In the alternative, the mobile station may start decoding downlink blocks. It should be appreciated that the PCCO message may include information assigning the uplink TBF or the downlink TBF or both. In some embodiments at least one of the uplink and downlink connections has two or more TBFs in a given direction. As far as the downlink operation is concerned, if the mobile station notices that a downlink TFI (temporary flow identity) has been assigned to it in the packet cell change order message, it decodes the blocks with this TFI on the assigned packet data channel (PDCH) in the new cell. The TFI identifies that the TBF has been assigned for the mobile station for data transfer purposes.

As far as the uplink operation is concerned, the mobile station is unable to send any data blocks in the new cell before it has received valid timing advance information from the network. The mobile station uses the timing advance information to adjust the time, within the duration of a timeslot, when it should send a data block Where the mobile station has been assigned an uplink TBF in the packet cell change order message which includes a USF (uplink state flag) for the new cell and the mobile station has noted this value in the new cell in a downlink block on the corresponding downlink PDCH and the mobile station does not yet have valid timing advance information, it will send four access bursts in each radio block indicated by the USF. The USF is used to reserve one or four uplink radio blocks in which the mobile station associated with the USF is allowed to transmit. The USF is received on a downlink PDCH and resources are reserved on the corresponding uplink PDCH. The USF tells which of the mobile stations camping on a PDCH is allowed to send on the corresponding uplink block. The mobile station will continue sending access bursts in all blocks indicated by this USF until it receives valid timing advance information from the network. Once this valid timing advance information has been received, the mobile station will continue communication in the uplink direction.

In the case that the mobile station has been assigned a downlink TBF and the mobile station notices the assigned TFI and a valid RRBP (relative reserved block period) field in a downlink block on the assigned downlink PDCH in the new cell and the mobile station does not have valid timing advance information, it will send four access bursts in the block indicated by the RRBP until it receives valid timing advance information. The RRBP value specifies a single uplink block in which a mobile station transmits either a packet control acknowledgement message or a PACCH (packet associated control channel) block to the network. After receiving Timing Advance information e.g. in the Packet DL Assignment message the mobile station will continue normal operation It is also possible to allocate the mobile station an uplink block for data or control message transfer or specifically for cell access purpose (i.e. for sending access bursts). In such case if the MS does not have valid timing advance it will send access bursts. As described above, after receiving timing advance information the mobile station will continue normal operation.

It should be appreciated that in embodiments of the invention, TBF handover enhances the capability to guarantee the agreed QoS level during the cell change. In addition it decreases common channel load and reduces service gap during the cell change. In some cases it is possible to get additional gain by not resetting RLC protocol entity during the TBF handover. However, this is not possible in all cases and therefore a mechanism is needed for signalling.

When the mobile station changes cell, the target cell may or may not be under the same packet control unit. The packet control unit is responsible for scheduling, RLC buffer handling and the like. If the target cell is under the control of the same packet control unit as in the source cell, there is no need to reset the operation of the radio link control RLC protocol entity or TBF. Rather the operation of the radio link control protocol or TBF can continue without disruption. This means amongst other things that blocks which have been sent but not acknowledged in the source cell can be acknowledged in the target cell. In other words, the block sequence numbers continue from where they were before the cell changed, ack/nack bitmaps take into account blocks sent in the old cell and so on. Additionally, the data transfer need not begin at the upper layer of the packet data unit PDU, that is at the LLC (layer link control)/PDU border or the like. In this regard reference is made to 3GPP Specification 44.060, Radio Link Control/Medium Access Control (RLC/MAC) Protocol.

It may be possible also in cases where the PCU changes that the radio link protocol entity or TBF is maintained and not reset. However this may require additional network capabilities (e.g. RLC contexts need to be transferred to target PCU etc).

In case the network does not support these additional requirements the operation of RLC should be reset in conjunction of cell change. Thus the RLC may need to be reset if there is a change in PCU and/or if the PCU stays the same. There is thus a difference in the user equipment behaviour depending on the situation and potentially on the capabilities of the user equipment. Therefore there should be a mechanism to define how the user equipment behaves.

One solution to this problem is to add a "Reset RLC" bit into Packet Cell Change Order or any other message that is sent to the user equipment during the cell change. If this bit is 0 the RLC entity is not reset during the cell change. In other words the temporary block flow TBF is maintained and the operation of the RLC is not reset. In the other case where the bit is 1 the old TBF is completely torn down and set up again in the new cell. Thus a new RLC instance is created, block numbers begin from initial values and the old cell ack/nack bitmap are not usable etc. In alternative embodiments, the bit 1 can be used to indicate that the RLC protocol entity or TBF is to be maintained and bit 0 to indicate that the RLC is to be reset.

An alternative solution to the problem would be to advise the mobile station or user equipment about the PCU identity of the target cell. This information may be provided via a broadcast message. For example this information could be included in a system information message/field such as in GPRS Cell options information element which is part of Packet system Information PSI 1 message. User equipment which is moving or ordered to move to a new cell would know based on these parameters whether the target cell is controlled by the same PCU as its current cell or not. This is because the user would already know the identity of the PCU associated with the source cell and would then be advised of the identity of the PCU associated with the target cell. In the case that the PCU does not change, the user equipment could continue operation in the target cell without resetting the RLC protocol entity or TBF. If the PCU changes the user equipment would reset the RLC when changing the cell.

In alternative embodiments of the present invention, the user equipment is provided with the PCU information for a different purpose other than for determining whether the RLC control entity or TBF is to be maintained or reset.

Figure 4A:
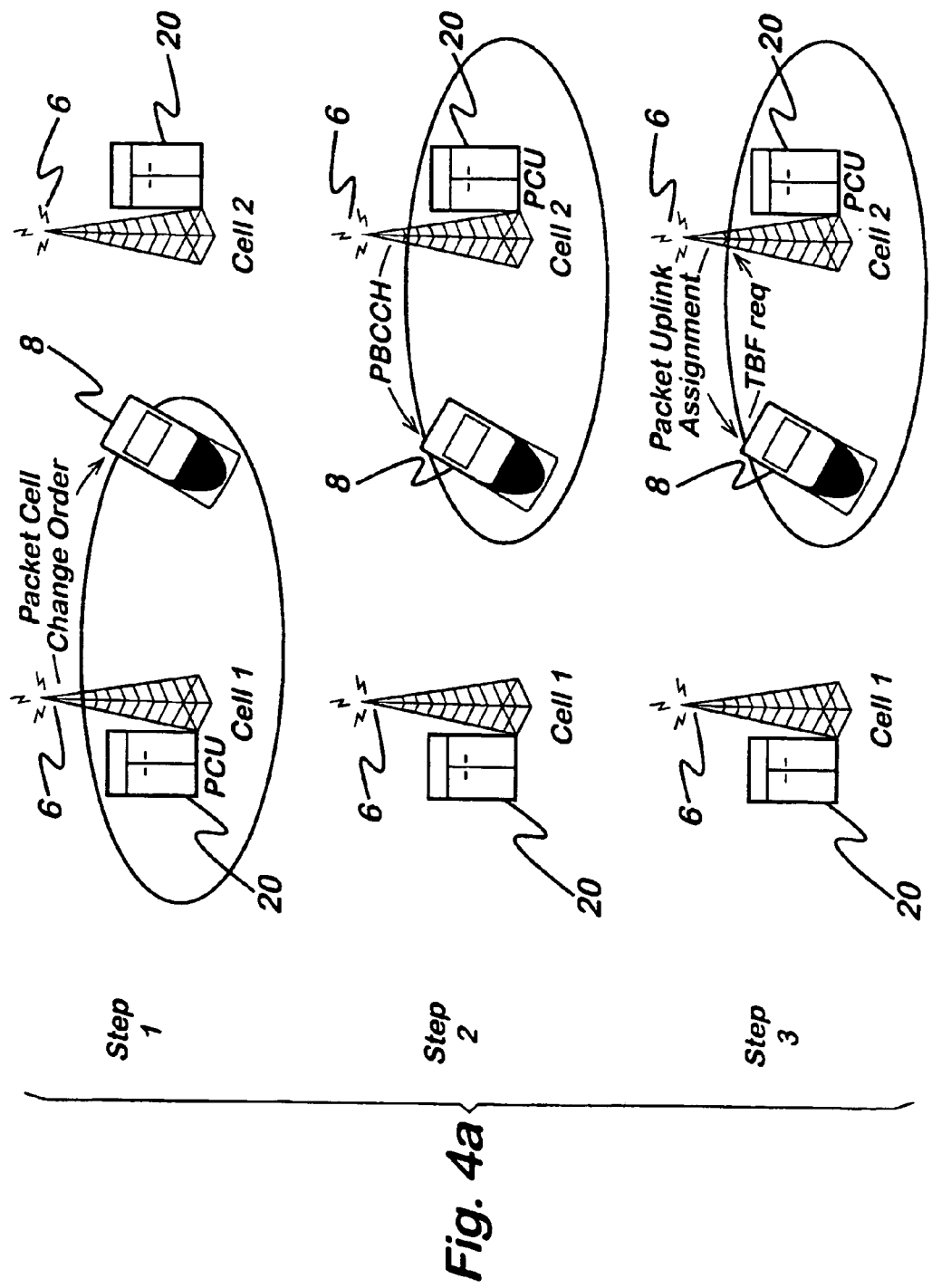
FIG. 4 illustrates embodiments of the present invention.

Reference is made to FIG. 4 In particular, FIG. 4A shows a first arrangement. The packet control units are associated with the base station so the target cell and source cell are controlled by different packet control units. Firstly, a packet control unit 20 of the network decides that the mobile station 8 should change from cell 1 to cell 2 (see step 1). The base station 6 of cell 1 sends the message to the mobile station 8. The mobile station 8 then starts communicating with the base station 6 of the new cell, cell 2 (see step 2). In particular, the mobile station 8 listens to the PBCCH (packet broadcast control channel) transmitted by the base station 6 of the cell 2. In known arrangements, the mobile station may not listen to the PBCCH but it can receive the system information messages via the source cell before terminating the TBF in the source cell and moving to the new cell. This is done with network assisted cell changes where the system information can be sent with the Packet Neighbour Cell Data message while still transferring data in the source cell. If this network assisted cell change feature is not supported, then the mobile station listens to the PBCCH as described above.

The information transmitted in the PBCCH channel is controlled by the packet control unit 20 associated with the base station 6 of the new cell (see step 3). Next; the mobile station 8 sends a TBF request to the base station 6 of the new cell. The base station 6 then sends packet uplink assignment information to mobile station 8. The mobile station is thus able to communicate with the base station. This is as currently proposed in the standard and will result in a break in the communications. If the RLC is reset then this is done when cell reselection takes place. This is discussed in more detail hereinafter.

Figure 4B:
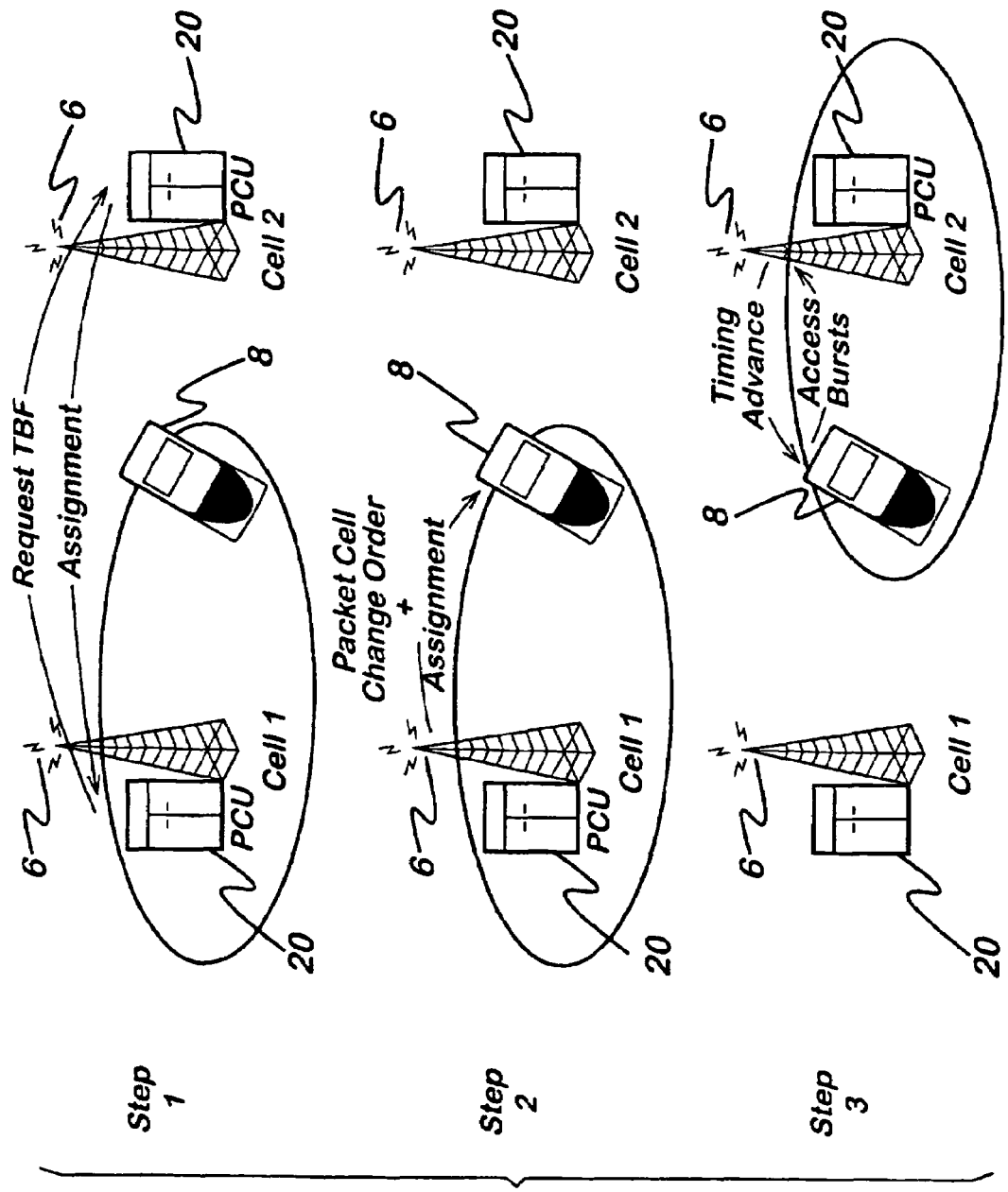

Reference is now made to FIG. 4B which shows a modified version of FIG. 4A, again assuming that the packet control units 20 are associated with the base stations 6. When it is determined by the packet control unit or any other network entity that the mobile station 8 is to move from cell 1 to cell 2, communication occurs between the packet control units 20 associated with each of the base stations (see step 1). In particular, the packet control unit 20 associated with the base station 6 of cell 1 sends a request to the packet control unit 20 associated with the base station 6 of the cell 2 requesting a TBF for the mobile station when it is in cell 2. The packet control unit 20 associated with the base station 6 of cell 2 sends information regarding the assigned TBF to the packet control unit 20 associated with the base station 6 of cell 1. The communication between the packet control units can be via the base station controllers and SGSN, or by any other suitable way. Information regarding the assigned TBF is then sent by the base station 6 of cell 1 to the mobile station (see step 2). In particular, the message, e.g. a PCCO packet cell change order containing the assignment information is sent to the mobile station. The mobile station will follow the instructions received in the PCCO message and at the given time (or immediately) it will leave the current PDCH and move to the assigned PDCH in the new cell according to received information. In the new cell the mobile station starts listening to downlink PDCH. In case the mobile station has been assigned the downlink TBF it can continue receiving data immediately after moving to the new cell. In the uplink direction no activity is possible before the mobile station has valid timing advance information. In case the mobile station has been assigned uplink TBF and it has valid timing advance information the mobile station may continue normal operation and send RLC/MAC data and/or control blocks in the uplink blocks indicated with USF or RRBP fields or using fixed allocation. In case the mobile station does not have valid timing advance information when it enters the new cell and begins listening to the assigned PDCH the mobile station must acquire valid timing advance information before it can operate normally i.e. send normal bursts. Timing advance information can be acquired by sending access bursts on allocated uplink blocks. The allocation can be given in the PCCO message before changing the cell (e.g. the block period or the TDMA frame number when bursts can be sent is indicated in the message). Alternatively the mobile station moves to the new cell and listens to the downlink PDCH and when it notices its USF or TFI and valid RRBP it sends the access bursts in the block indicated by the USF or RRBP fields. Alternatively, the mobile station can send access bursts in the block indicated by the PCCO and get the timing advance information in the downlink control channel. In step 3, timing advance information is then obtained from the base station 6 of the second cell e.g. in the Packet UL/DL Assignment or some other message and thereafter communication can continue as normal. If, the RLC link is reset, this is done during cell reselection. This is discussed in more detail hereinafter.

During the cell change it may happen that either the network does not receive access bursts or the mobile station does not receive the message from the network containing valid timing advance information. In such case the mobile station will continue sending access bursts whenever allocated an uplink resource by USF or RRBP field. In case the network receives access bursts in the allocated uplink block after sending the MS valid timing advance information the network sends the timing advance information again.

Figure 4C:
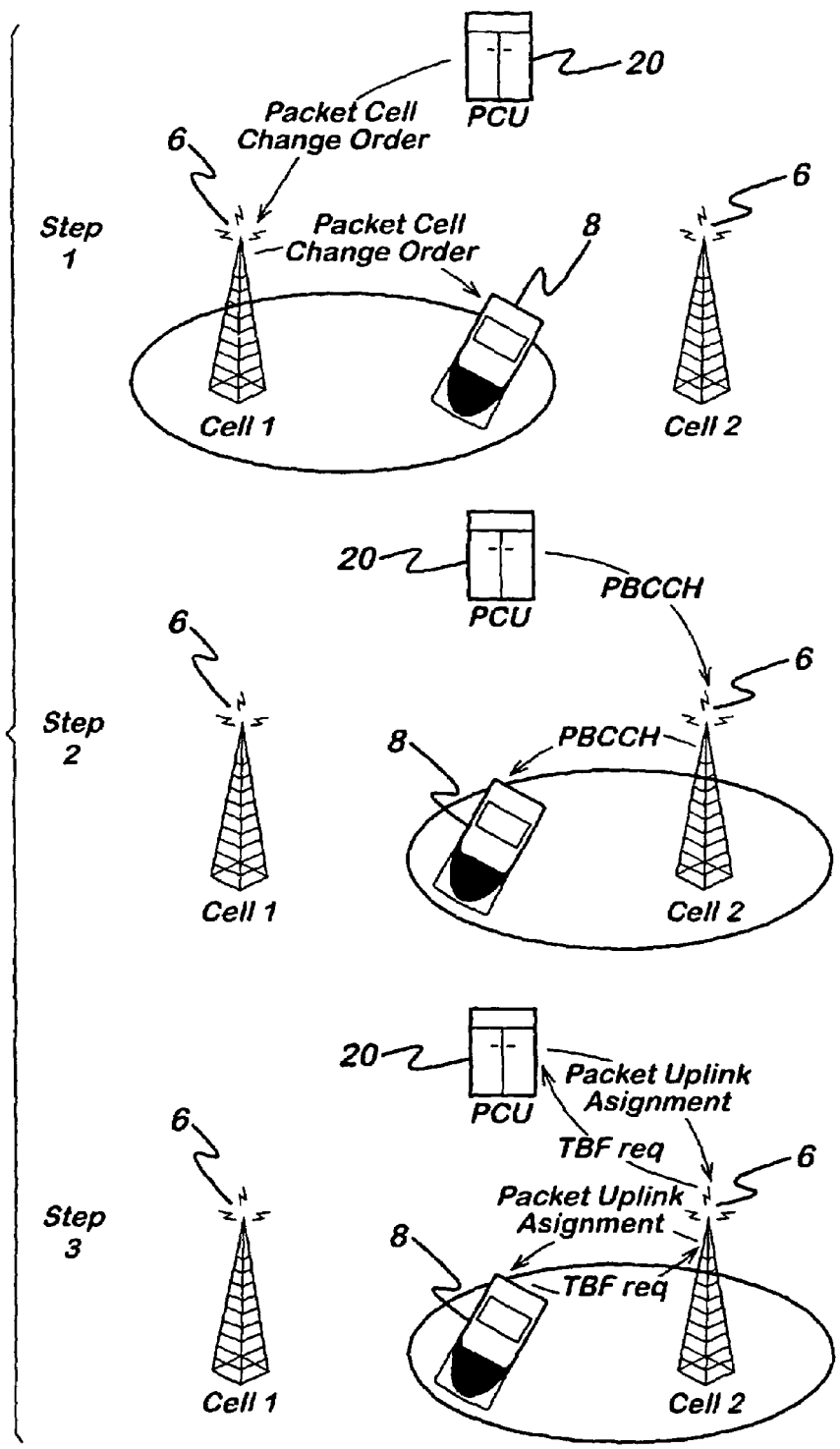

Reference is now made to FIG. 4C which shows the situation where the packet control unit is remote from the base station. The packet control unit 20 may be associated with the base station controller, SGSN or indeed any other network entity or may be a separate entity in its own right. The packet control unit controls both the source cell and the target cell. When the network determines that the mobile station should change from cell 1 to cell 2, the packet control unit 20 sends a packet cell change order to the base station 6 associated with cell 1 (see step 1). The base station 6 in turn sends the packet cell change order to the mobile station 8. Next, in step 2, the mobile station 8 monitors the PBCCH channel transmitted by the base station 6 of cell 2. In the known arrangement the mobile station may not have to listen to the PBCCH but it can receive the system information messages via source cell before terminating the TBF in the source cell and moving to the new cell. This is as discussed in relation to FIG. 4A. The base station 6 of cell 2 receives PDCH channel information from the packet control unit 20. In step 3, the mobile station 8 sends a request for the TBF to the base station 6 of cell 2. That request is forwarded by the base station to the packet control unit 20. The packet control unit 20 sends information defining the packet uplink assignment to the base station 6 associated with cell 2. That base station 6 forwards the packet uplink assignment information to the mobile station 8. Again, as with the arrangement shown in FIG. 4A, there is a delay before the connection is properly established with the new base station. It should be appreciated that the RLC protocol entity or TBF may be maintained as the mobile station moves form the source cell to the current cell.

Figure 4D:
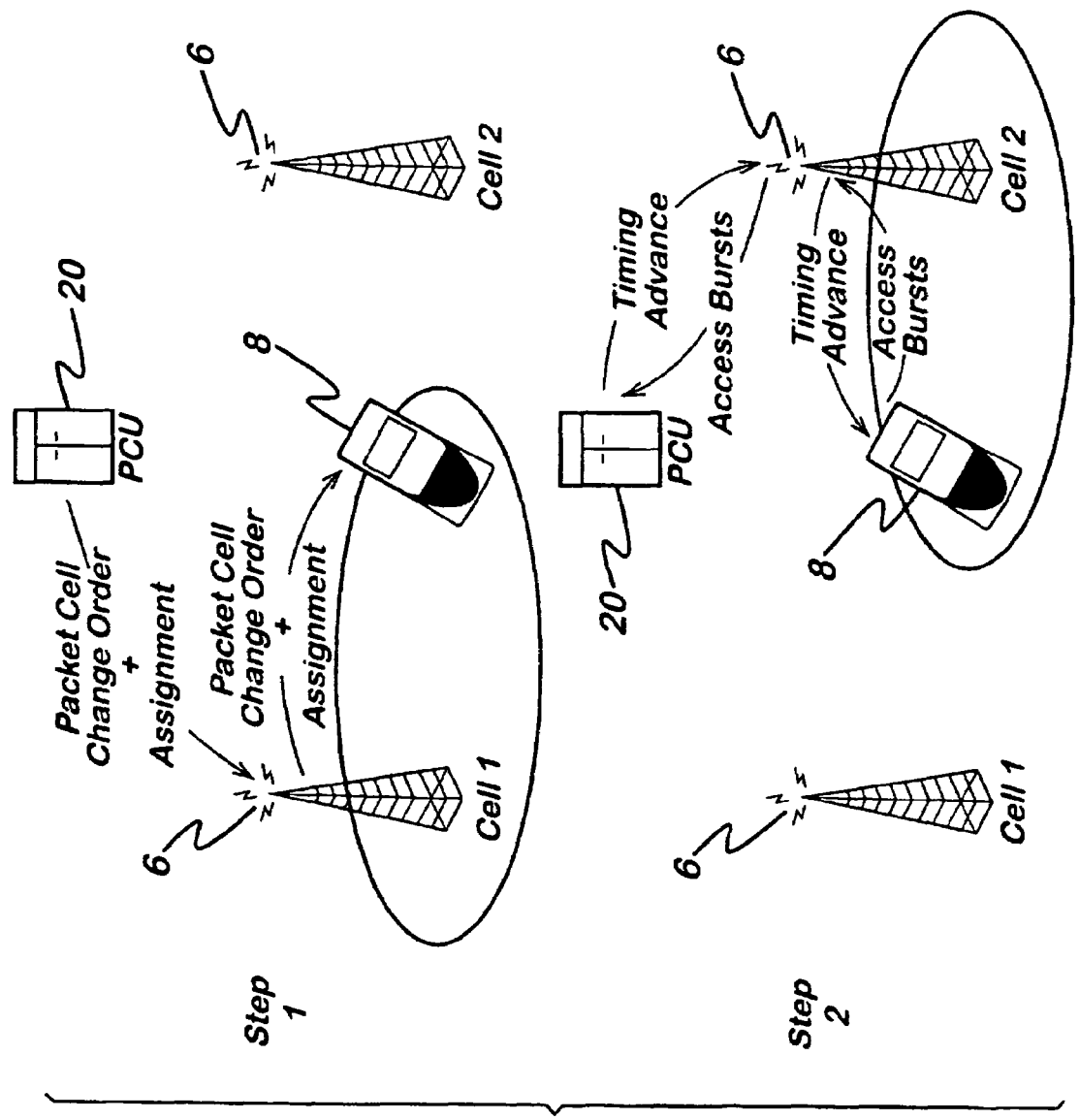

Reference is made to FIG. 4D which shows a modification of the arrangement of FIG. 4C. The same packet control unit controls the source and target cell. In step 1, the packet control unit 20 sends a packet cell change order along with assignment information to the base station 6 of cell 1. That base station 6 forwards that information to the mobile station 8. Assuming that the MS does not have valid timing advance information in step 2, the mobile station 8 then sends access bursts to the base station 6 associated with cell 2 in allocated block period. As with the embodiment shown in FIG. 4B the allocated block period can be indicated in the PCCO assignment information part or it can be indicated using the USF or RRBP fields of downlink RLC/MAC blocks on the assigned PDCH. Access bursts are forwarded to the packet control unit 20 which provides timing advance information to the base station 6 of cell 2. That timing advance information is then sent back to the base station 6 so that the mobile station and base station of cell 2 can commence communicating as normal. It should be appreciated that the RLC entity or TBF may be maintained as the mobile station moves form the source cell to the current cell.

In all of the situations discussed in relation to FIGS. 4A-D, if TBF handover is carried out, it may be possible to continue the same TBF, that is not reset the operation of the RLC protocol. Usually, but not always this will be where the packet control unit does not change. However, may be possible to use the same TBF even where the packet control network does not change, as mentioned previously. In the embodiment where the RESET RLC information is used, whether or not the RLC is reset will depend on this information. Thus the RLC may not be reset even if the PCU changes. In those embodiments which use the PCU identity the RLC will always be reset if the PCU changes.

It should be appreciated that the packet control unit can be provided in any suitable location in the network.

If the target cell is under the coverage of the same packet control unit as the source unit, the radio link control can be suspended (and not reset) whilst the cell change occurs. After the cell change occurs, this can be resumed. In other words, there is no need for relocating the radio link control buffers. If on the other hand, different packet control units are required, RLC buffer relocation would enhance the performance. However, this is not required. The mobile station may be moved to another cell when there is still unsent data in the network side RLC buffer (eg when the signal strength decreases rapidly). If the new cell is under a different packet control unit the unsent data may be moved (via the fixed network) to the packet control unit of the target cell. This is called the relocation of the RLC buffer. In preferred embodiments of the invention, the link is not suspended but the network moves the mobile station to a specific PDCH in the target cell and continues operation. If the PCU does not change there is no need to relocate buffers and the RLC protocol related parameters.

Reference will now be made to the dual transfer mode DTM in which the mobile station has a circuit switched connection and a GPRS connection at the same time. Embodiments of this invention can be used with other arrangements where there is a shared channel and a dedicated channel at the same time. This is regardless of whether the channels are both circuit switched, both packet switched or one of each.

The DTM case is analogous to the arrangements described previously except that the TBF assignment information is included in the handover command. In this way, both the dedicated and shared channel connection can be moved simultaneously without dropping the TBF as is done currently. In the case that the TBF assignment information is not included in the handover command, the TBF is terminated and the data transfer is resumed by setting up a TBF using DTM procedures.

The packet cell change order message has the following format. The required additional information described above may be incorporated in this field. It should be appreciated that the information can take any suitable form and can be incorporated in an suitable message.

PAGE_MODE (2 bit field)
Global TFI
This information element contains the TFI of the mobile station's downlink TBF or uplink TBF.
TLLI (32 bit field)
This is the temporary logical link identity. It is the temporary logical identity identifying the logical link connection.

IMMEDIATE_REL (bit)
This field indicates whether the mobile shall immediately abort any operation in the old cell and move to the target cell or if it should not immediately abort operation in the old cell and follow a cell reselection procedure, such as that embodying the invention. This field is coded according to the following table:

| | |
|---|---|
| 0 | No immediate abort of operation in the old cell is required. |
| 1 | Immediate abort of operation in the old cell is required. |

ARFCN (10 bit field) Absolute Radio Frequency Channel Number
This field contains the BCCH frequency of the new cell. This field is encoded as the ARFCN defined in 3GPP TS 44.018. This identifies the allocated channel. Range 0 to 1023
BSIC (6 bit field) (Base station identity code)
This field contains the BSIC of the new cell. This field is encoded as the BSIC value defined in 3GPP TS 44.018.
Range 0 to 63
CCN_ACTIVE (1 bit field) Cell Change Notification
This field indicates whether CCN is enabled for the mobile station in the cell addressed by ARFCN and BSIC. It is coded as follows:

| | |
|---|---|
| 0 | The broadcast CCN_ACTIVE parameter shall apply if available. Otherwise, CCN is disabled for the mobile station. |
| 1 | CCN is enabled for the mobile station. |

CONTAINER_ID (2 bit field)
This optional parameter is included only if the network has earlier sent neighbour cell system information for the cell addressed by the ARFCN and the BSIC.

The NC (network control)_Measurement-Parameters struct contains the NETWORK_CONTROL_ORDER and the optional parameters NC_NON_DRX_PERIOD, NC_REPORTING_PERIOD_I, NC_REPORTING_PERIOD_T and the NC_FREQUENCY LIST. These parameters shall apply in the target cell. NETWORK_CONTROL_ORDER (2 bit field)
The NETWORK_CONTROL_ORDER field is coded according to the following table:

| bit 2 1 | |
|---|---|
| 0 0 | NC0 |
| 0 1 | NC1 |
| 1 0 | NC2 |
| 1 1 | RESET |

NC_NON_DRX_PERIOD (3 bit field).
NC_REPORTING_PERIOD_I (3 bit field)
NC_REPORTING_PERIOD_T (3 bit field)
NC_FREQUENCY_LIST
3G Target Cell struct
Bandwidth_FDD (3 bit field) (Frequency division duplex)
FDD_ARFCN (14 bit field)
This information element is defined as the UARFCN in 3G TS 25.101. Any non-supported frequency shall not be considered as an error; indices of the 3G Neighbour Cell list shall be incremented accordingly.

Scrambling Code (9 bit field)
This parameter indicates the Primary Scrambling Code as defined in 3GPP TS 25.213.
Diversity (1 bit field)
This parameter indicates if diversity is applied for the cell:

| Bit | |
|---|---|
| 0 | Diversity is not applied for this cell |
| 1 | Diversity is applied for this cell. |

Bandwidth_TDD (3 bit field) (Time division duplex)
This optional information element refers to 3G TS 25.331.

| Bit 3 2 1 | |
|---|---|
| 0 0 0 | 3.84 Mcps |
| 0 0 1 | 1.28 Mcps |

All other values shall not be interpreted as an error; indices of the 3G Neighbour Cell list shall be incremented accordingly (but no reporting can be performed). When missing, this indicates 3.84 Mcps.
TDD_ARFCN (14 bit field)
This optional information element is defined as the UARFCN in 3G TS 25.102. Any non supported frequency shall not be considered as an error; indices of the 3G Neighbour Cell list shall be incremented accordingly.
Cell Parameter (7 bit field)
This parameter is defined in 3GPP TS 25.223.
Sync Case (1 bit field)
This parameter is defined in 3GPP TS 25.223

| Bit | |
|---|---|
| 0 | Sync Case 1 |
| 1 | Sync Case 2 |

CCN Support Description
CCN_SUPPORTED (1 bit field)
This parameter is used for determining whether the mobile station shall enter CCN mode when re-selecting a cell and CCN is enabled:

| Bit | |
|---|---|
| 0 | CCN is enabled towards the corresponding cell |
| 1 | CCN is disabled towards the corresponding cell |

The packet downlink assignment information packet contains the following information and in preferred embodiments of the invention is modified as discussed hereinbefore.
PAGE_MODE (2 bit field)
PERSISTENCE_LEVEL (4 bit field for each Radio Priority 1 . . . 4)
Referenced address struct
This information element contains the address of the mobile station addressed by the message.
Global TFI
This information element contains the TFI of the mobile station's downlink TBF or uplink TBF.
TLLI (32 bit field)
MAC_MODE (2 bit field)
This information field indicates the medium access method to be used during the TBF.

| bit 21 | |
|---|---|
| 0 0 | Dynamic Allocation |
| 0 1 | Extended Dynamic Allocation |
| 1 0 | Fixed Allocation, not half duplex mode |
| 1 1 | Fixed Allocation, half duplex mode |

RLC MODE (1 bit field)
This field indicates the RLC mode of the requested TBF.

| 0 | RLC acknowledged mode |
|---|---|
| 1 | RLC unacknowledged mode |

CONTROL_ACK (1 bit field)
This field shall be set to '1' if the network establishes a new downlink TBF for the mobile station whose timer T3192 is running. Otherwise this field shall be set to '0'.
TIMESLOT_ALLOCATION (8 bit field)
Packet Timing Advance
P0 (4 bit field)
See the Packet Uplink Assignment message.
BTS_PWR_CTRL_MODE (1 bit field)
See the Packet Uplink Assignment message.
PR_MODE (1 bit field)
See the Packet Uplink Assignment message.
Power Control Parameters
Frequency Parameters
DOWNLINK_TFI_ASSIGNMENT (5 bit field)
This information element, if present, assigns the TFI to the mobile station to identify to downlink TBF described by this message.
TBF Starting Time
The TBF Starting Time field contains a starting time that indicates the TDMA frame number during which the assigned TBF may start. If no downlink TBF is in progress, the mobile station need not monitor the TFI field of downlink RLC data blocks until the indicated TDMA frame number. After the indicated TDMA frame number, the mobile station shall operate as during a downlink TBF. If a downlink TBF is already in progress, the mobile station shall continue to use the parameters of the existing TBF until the TDMA frame number occurs. When the indicated TDMA frame number occurs, the mobile station shall immediately begin to use the new parameters assigned.
Measurement Starting Time
The Measurement Starting Time field contains a starting time that indicates the frame number during which the first assigned measurement period shall occur. The mobile station must make one or more neighbour cell power measurements during the assigned frame number and during the following 3 TDMA frames.
MEASUREMENT_BITMAP (8 bit field)
This information field indicates the timeslots assigned for use during measurement periods. The field as a bitmap where each bit corresponds with a timeslot number. Bit 1 corresponds to TS0; Bit 2 to TS1 . . .

| | |
|---|---|
| 0 | the MS shall receive downlink data during this timeslot |
| 1 | the MS shall make measurements during the timeslot |

MEASUREMENT_INTERVAL (5 bit field)

The Measurement Interval field indicates the number of block periods from the start of one assigned measurement period to the beginning of the next measurement period.

| bit 5 4 3 2 1 | |
|---|---|
| 0 0 0 0 0 | make measurements during every block period |
| 0 0 0 0 1 | make measurements during every other block period |
| 0 0 0 1 0 | make measurements during every 3rd block period |
| 1 1 1 1 1 | make measurements during every 32nd block period |

EGPRS Window Size (Enhanced GPRS)

LINK_QUALITY_MEASUREMENT_MODE (2 bit field)

This field determines the measurements to be included within the EGPRS Timeslot Link Quality Measurements IE.

| bit 2 1 | |
|---|---|
| 0 0 | The MS shall not report either interference measurements or per slot BEP measurements. |
| 0 1 | The MS shall report available interference measurements for timeslots 0 through 7. The ☐ value is defined in 3GPP TS 45.008. No per slot mean BEP measurements shall be reported. |
| 1 0 | The MS shall report mean BEP on each allocated time slot. The MS shall report the mean BEP measurement corresponding to the modulation for which it has received a larger number of blocks since the previous report. The MS shall make BEP measurements only on Radio Blocks intended for it. No interference measurements (☐ values) shall be reported. |
| 1 1 | The MS shall report mean BEP on each allocated time slot. The MS shall report the mean BEP measurement corresponding to the modulation for which it has received a larger number of blocks since the previous report. The MS shall make BEP measurements only on Radio Blocks intended for it. In addition to mean BEP, the MS shall report interference measurements for no more than four time slots. The MS shall first report available interference measurements for time slots 0, 1, 2, and 3; the MS shall next report available interference measurements for time slots 4, 5, 6, and 7; and the MS shall alternate between these two groups for subsequent reports. If any of the interference measurements are unavailable for reporting for reasons specified in 3GPP TS 45.008, the MS shall substitute least-recently-reported and available interference measurements for time slots not already included in the report. |

All other values are reserved.

Packet Extended Timing Advance (2 bit field)

COMPACT reduced MA

All other values are reserved.

Packet Extended Timing Advance

Compact reduced MA

BEP_PERIOD2 (4 bit field)

This field contains a constant which is used for filtering channel quality measurements in EGPRS. BEP_PERIOD2 when present, or if not, when received in a previous message of the same TBF session, shall be used instead of BEP_PERIOD. For details see 3GPP TS 45.008. Range: 0 to 15

The packet uplink assignment information element details are as follows PAGE_MODE (2 bit field)

PERSISTENCE_LEVEL (4 bit field for each Radio Priority 1 . . . 4)

Referenced Address struct

This information element contains the address of the mobile station addressed by the message.

Global TFI

This information element identifies the uplink TFI, if available, or the downlink TFI, to which this message applies.

TQI (16 bit field)

Packet Request Reference

TIMESLOT_ALLOCATION (8 bit field)

If this field is not present, the timeslot allocation is indicated by the Power Control Parameters IE.

CHANNEL_CODING_COMMAND (2 bit field)

The Channel Coding Indicator field indicates the channel coding scheme that the mobile station shall use when transmitting data on the uplink. bit

| bit 2 1 | |
|---|---|
| 0 0 | CS-1 |
| 0 1 | CS-2 |
| 1 0 | CS-3 |
| 1 1 | CS-4 |

CONTENTION_RESOLUTION_TLLI (32 bit field)

The CONTENTION_RESOLUTION_TLLI field is present only if the network has decoded one of the uplink blocks containing the TLLI during the EGPRS one phase access. The mobile station shall perform the contention resolution function if this field is present. This field contains a TLLI.

COMPACT reduced MA

EGPRS Modulation and Coding Scheme

Resegment

EGPRS Window Size

TLLI_BLOCK_CHANNEL_CODING (1 bit field)

This field indicates the channel coding command that the mobile station shall use for any RLC data block containing a TLLI field in the RLC data block header. This field is coded as shown:

| | |
|---|---|
| 0 | the MS shall use CS-1 in GPRS TBF mode or MCS-1 in EGPRS TBF mode for any RLC data block containing a TLLI in the RLC data block header |
| 1 | the MS shall use the value commanded in the CHANNEL_CODING_COMMAND for any RLC data block containing a TLLI in the RLC data block header |

BEP_PERIOD2 (4 bit field)

This field contains a constant which is used for filtering channel quality measurements in EGPRS. BEP_PERIOD2 when present, or if not, when received in a previous message of the same TBF session, shall be used instead of BEP_PERIOD. For details see 3GPP TS 45.008.

Range: 0 to 15

UPLINK_TFI_ASSIGNMENT (5 bit field)

This information element, if present, assigns the contained TFI to the mobile station to identify to uplink TBF described by this message.

Packet Timing Advance

Frequency Parameters

This information element, if present, assigns frequency parameters to the uplink TBF. If this information element is not present the mobile station shall use its previously assigned frequency parameters. 8.

Dynamic Allocation struct

This information element contains parameters necessary to define the radio resources of a dynamic allocation or an extended dynamic allocation.

EXTENDED_DYNAMIC_ALLOCATION (1 bit field)

This information field indicates the medium access mode to be used during the TBF.

| 0 | Dynamic Allocation |
| 1 | Extended Dynamic Allocation |

Power Control Parameters

This information element, if present, contains power control parameters and the timeslot allocation for the mobile station. If this information element is not present, the MS shall continue to use the previous parameters.

RLC_DATA_BLOCKS_GRANTED (8 bit field)

The RLC/MAC blocks Granted field assigns a fixed number of RLC data blocks that the mobile station shall transmit during the uplink TBF. If the RLC_DATA_BLOCKS_GRANTED field is present the mobile station shall transmit only the assigned number of RLC data blocks. Otherwise the duration of the uplink TBF is undefined. Retransmissions of negatively acknowledged RLC data blocks do not apply toward the maximum number. This field is encoded as a binary number as shown:

| bit<br>8 7 6 5 4 3 2 1 | |
| --- | --- |
| 0 0 0 0 0 0 0 0 | 9 RLC data blocks |
| 0 0 0 0 0 0 0 1 | 10 RLC data blocks |
| 1 1 1 1 1 1 1 1 | 264 RLC data blocks |

TBF Starting Time

The TBF Starting Time field contains a starting time that indicates the frame number during which the assigned TBF may start.

In case of dynamic allocation, if no uplink TBF is in progress, the MS need not monitor the USF field until the TDMA frame number occurs. When the indicated TDMA frame number occurs, the mobile station shall immediately begin to monitor the USF field and use the new assigned uplink TBF parameters when its USF has occurred. If an uplink TBF is already in progress, the MS shall continue to use the parameters of the existing TBF until the TDMA frame number occurs. When the indicated TDMA frame number occurs, the mobile station shall immediately begin to monitor the USF field and use the new assigned uplink TBF parameters when its USF has occurred.

In case of single block allocation, the mobile station shall use the assigned timeslot during the RLC/MAC block whose first TDMA burst occurs in the indicated TDMA frame number.

In case of fixed allocation, if no uplink TBF is in progress, the MS shall wait until the TDMA frame number occurs, and then, shall use the assigned uplink resources from the indicated TDMA frame number forward, according to the parameters in the fixed allocation struct. If an uplink TBF is in progress, the MS shall continue to use the parameters of the existing TBF until the TDMA frame number occurs. When the TDMA frame number occurs, the MS shall then use the assigned uplink resources from the indicated TDMA frame number forward, according to the parameters in the fixed allocation struct.

This information element is encoded as the Starting Frame Number Description IE.

| USF for Timeslot Number 0 | (TN0) | (3 bit field) |
| USF for Timeslot Number 1 | (TN1) | (3 bit field) |
| USF for Timeslot Number 2 | (TN2) | (3 bit field) |
| USF for Timeslot Number 3 | (TN3) | (3 bit field) |
| USF for Timeslot Number 4 | (TN4) | (3 bit field) |
| USF for Timeslot Number 5 | (TN5) | (3 bit field) |
| USF for Timeslot Number 6 | (TN6) | (3 bit field) |
| USF for Timeslot Number 7 | (TN7) | (3 bit field) |

These fields indicate the USF value assigned to the MS for allocated timeslots (range 0 to 7). These fields are encoded as a binary presentation of the USF value.

USF_GRANULARITY (1 bit field)

This information field indicates the USF granularity to be applied by the mobile station when it is assigned a TBF using Dynamic Allocation.

| 0 | the mobile station shall transmit one RLC/MAC block |
| 1 | the mobile station shall transmit four consecutive RLC/MAC blocks |

Single Block Allocation struct

This information element contains parameters necessary to define the radio resources of a Single Block allocation. For example for sending of a PACKET RESOURCE REQUEST message in a two phase access or a Measurement report.

TIMESLOT_NUMBER (3 bit field)

This field indicates the timeslot assigned for transfer of a single RLC/MAC block on the uplink. This field is coded as the binary representation of the timeslot number as defined in 3GPP TS 45.010.

Range 0 to 7

ALPHA (4 bit field)

For encoding and description see the Global Power Control Parameters IE.

GAMMA_TN (5 bit field)

The GAMMA_TN field is the binary representation of the parameter rCH for MS output power control in units of 2 dB, see 3GPP TS 45.008. The GAMMA_TN field is coded according to the following table:

| bit<br>5 4 3 2 1 | | |
| --- | --- | --- |
| 0 0 0 0 0 | rCH = 0 | dB |
| 0 0 0 0 1 | rCH = 2 | dB |
| . | . | . |
| . | . | . |
| . | . | . |
| 1 1 1 1 0 | rCH = 60 | dB |
| 1 1 1 1 1 | rCH = 62 | dB |
| P0 (4 bit field) | | |

This field is an optional downlink power control parameter. If P0 is present, then downlink power control is used; otherwise, if P0 is not present, then downlink power control is not used. Its meaning is specific to downlink power control modes A and B used by the network, as per 3GPP TS 45.008. It is encoded as follows:

| bit<br>4 3 2 1 | |
|---|---|
| 0 0 0 0 | P0 = 0 dB |
| 0 0 0 1 | P0 = 2 dB |
| 0 0 1 0 | P0 = 4 dB |
| . | |
| . | |
| . | |
| 1 1 1 1 | P0 = 30 dB |

BTS_PWR_CTRL_MODE (1 bit field)

This field indicates the downlink power control mode used by the network, as defined in 3GPP TS 45.008. It is encoded as follows:

| 0 | Mode A |
|---|---|
| 1 | Mode B |

PR_MODE (1 bit field)

This field indicates, as defined in 3GPP TS 45.008. It is encoded as follows:

| 0 | PR mode A: for one addressed MS |
|---|---|
| 1 | PR mode B: for all MS |

Fixed Allocation struct

This information element contains parameters necessary to define the radio resources of a fixed allocation.

FINAL_ALLOCATION (1 bit field)

This field indicates whether this allocation is the last allocation of the TBF.

| 0 | this allocation is not the last allocation of the TBF |
|---|---|
| 1 | this allocation is the last allocation of the TBF |

HALF_DUPLEX_MODE (1 bit field)

This information field indicates, for multislot class 19 to 29, whether the mobile station shall operate in half duplex mode. Other mobile stations shall consider this field as 0.

| 0 | the MS shall not operate in half duplex mode |
|---|---|
| 1 | the MS shall operate in half duplex mode |

BLOCKS_OR_BLOCK_PERIODS (1 bit field)

This indicates if the ALLOCATION_BITMAP is to be interpreted as blocks or block periods.

| 0 | the ALLOCATION_BITMAP is to be interpreted as blocks |
|---|---|
| 1 | the ALLOCATION_BITMAP is to be interpreted as block periods |

DOWNLINK_CONTROL_TIMESLOT (3 bit field)

This information field indicates the downlink timeslot that mobile station operating in fixed allocation mode shall monitor for downlink PACCH. This field is coded as the binary representation of the timeslot number as defined in 3GPP TS 45.010.

Range 0 to 7

ALLOCATION_BITMAP_LENGTH (7 bit field)

This specifies the number of bits in the ALLOCATION_BITMAP.

Range 0 to 127

ALLOCATION_BITMAP (variable length field) If The ALLOCATION_BITMAP field is variable length. If the ALLOCATION_BITMAP_LENGTH field is not present, the ALLOCATION_BITMAP fills the remainder of the message. If the BLOCKS_OR-BLOCK_PERIODS field is not present, then the ALLOCATION_BITMAP should be interpreted as blocks. This field is defined in subclause 12.4.

Packet Extended Timing Advance (2 bit field)

Multi Block Allocation struct

This information element contains parameters necessary to define the radio resources of a Multi Block allocation.

NUMBER OF RADIO BLOCKS ALLOCATED(2 bit field)

| Bits<br>1 0 | |
|---|---|
| 0 0 | 1 radio block reserved for uplink transmission |
| 0 1 | 2 radio blocks reserved for uplink transmission |
| 1 0 | reserved for future use |
| 1 1 | reserved for future use |

ACCESS TECHNOLOGY TYPE

This field indicates the access technology that is requested from the mobile station. The field is coded according to the definition in 3GPP TS 44.018. The access technology types requested from the MS in the Access Technologies Request structure shall be classified by priority, the most important first. The MS shall reply using the same order.

ARAC RETRANSMISSION REQUEST (1 bit field)

| 0 | indicates that retransmission of an ADDITIONAL MS RADIO ACCESS CAPABILITIES message is not requested |
|---|---|
| 1 | indicates that retransmission of an ADDITIONAL MS RADIO ACCESS CAPABILITIES message is requested |
| Reset RLC - | 1 - reset RLC |
| | 0 - maintain current RLC |

It should be appreciated that whilst embodiments of the present invention have been described in the context of a GPRS system, embodiments of the present invention can be implemented with modifications to the GPRS system such as EGPRS or GPRS/GERAN. Embodiments of the present invention can also be implemented with any other circuit or packet switched systems. Embodiments of the present invention are, however, particularly applicable to data packet Embodiments of the present invention are not just applicable to wireless systems but may also be used with wired systems or the like. The messages described hereinbefore are by way of example and the information required can be provided in any suitable message or be provided in a dedicated message. The messages described are GPRS messages. It should be appreciated that in alternative embodiments of the invention, different standards may apply. The content of the packets may differ as may the format of the information. Different standards may use different names for the same type of information.

The invention claimed is:

1. A method, comprising:
   receiving a message indicating whether the operation of the radio link control protocol is to be continued or reset when handing over user equipment from a source cell to a target cell in a cellular communications network, said cellular communications system comprising a plurality of control units;
   resetting the operation of said radio link control protocol when the message indicates that the current radio link control protocol is to be reset; or
   continuing the operation of said radio link control protocol when the message indicates that the radio link control protocol is to be continued.

2. The method of claim 1, wherein receiving said message comprises receiving a handover message.

3. The method of claim 1, wherein receiving said message comprises receiving a packet cell change order message.

4. The method of claim 1, further comprising:
   obtaining, from said message, information that the operation of the current radio link is to be maintained or reset.

5. The method of claim 1, further comprising:
   obtaining, from said message, information that identifies a control unit associated with the target cell;
   when the control unit associated with the target cell is also associated with the source cell, maintaining the operation of the current radio link; and
   when the control unit associated with the target cell is not also associated with the source cell, resetting the operation current radio link.

6. The method of claim 1, wherein said plurality of control units comprise at least one packet control unit.

7. The method of claim 1, further comprising:
   configuring at least one of the following entities incorporates a control unit of the plurality of control units
   a base station,
   a base station controller,
   a mobile services switching center, or
   a signalling general packet radio service support node.

8. The method of claim 1, further comprising:
   sending to and/or receiving at the user equipment packets.

9. The method of claim 1, further comprising:
   configuring said network to operate in accordance with a general packet radio service standard.

10. The method of claim 1, further comprising:
    configuring said user equipment to comprise a mobile station.

11. The method of claim 1, further comprising:
    maintaining said operation of the radio link control protocol when the source cell and the target cell are controlled by a same control unit.

12. A cellular communications system, comprising:
    at least one user equipment;
    a plurality of cells; and
    a plurality of control units,
    wherein said user equipment is configured to be handed over from a source cell to a target cell and is configured to receive a message indicating whether the operation of a current radio link control protocol of the source cell is to be maintained or reset in the target cell, and
    wherein the network is configured to reset the operation of the radio link control protocol when the message indicates that the operation of the current radio link control protocol is to be reset, or to maintain the operation of said radio link control protocol when the message indicates that the operation of the radio link control protocol is to be reset.

13. The method of claim 1, wherein said continuing the operation of said radio link control protocol comprises allowing data blocks that have been sent but not acknowledged in the source cell to be acknowledged in the target cell.

14. The system of claim 12, wherein said maintenance of the operation of the current radio link control protocol is configured to allow data blocks that have been sent but not acknowledged in the source cell to be acknowledged in the target cell.

15. An apparatus, comprising: a receiver configured to receive a message indicating whether the operation of the radio link control protocol is to be continued or reset when changing cell in a cellular communication network,
    wherein the apparatus is configured to reset the operation of said radio link control protocol when the message indicates that the current radio link control protocol is to be reset, and
    wherein the apparatus is configured to continue the operation of said radio link control protocol when the message indicates that the radio link control protocol is to be continued.

* * * * *